US009204155B2

(12) United States Patent
Liu et al.

(10) Patent No.: US 9,204,155 B2
(45) Date of Patent: Dec. 1, 2015

(54) MULTIPLE PREDICTOR SET FOR INTRA CODING WITH INTRA MODE PREDICTION

(75) Inventors: Lingzhi Liu, San Jose, CA (US); Guichun Li, Santa Clara, CA (US); Nam Ling, San Jose, CA (US); Jianhua Zheng, Shenzhen (CN); Cheng-Xiong Zhang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1045 days.

(21) Appl. No.: 13/247,555

(22) Filed: Sep. 28, 2011

(65) Prior Publication Data
US 2012/0082221 A1   Apr. 5, 2012

Related U.S. Application Data

(60) Provisional application No. 61/388,485, filed on Sep. 30, 2010.

(51) Int. Cl.
| | |
|---|---|
| H04N 7/26 | (2006.01) |
| H04N 19/196 | (2014.01) |
| H04N 19/176 | (2014.01) |
| H04N 19/147 | (2014.01) |
| H04N 19/11 | (2014.01) |

(52) U.S. Cl.
CPC ............ *H04N 19/198* (2014.11); *H04N 19/11* (2014.11); *H04N 19/147* (2014.11); *H04N 19/176* (2014.11)

(58) Field of Classification Search
CPC .................. H04N 19/00381; H04N 19/00042; H04N 19/00175; H04N 19/00278
USPC ....................................................... 375/240.12
See application file for complete search history.

(56) References Cited

U.S. PATENT DOCUMENTS

| | | | |
|---|---|---|---|
| 7,450,640 B2 * | 11/2008 | Kim et al. ................ | 375/240.12 |
| 2013/0177077 A1 * | 7/2013 | Yeo et al. ................ | 375/240.12 |

OTHER PUBLICATIONS

Takeshi et al. Adaptive Multidirectional Intra Prediction, Oct. 2007, Sharp Corporation.*
Yan Ye, et al., "Improved H.264 Intra Coding Based on Bi-Directional Intra Prediction, Directional Transform, and Adaptive Coefficient Scanning," IEEE International Conference Image Process. 2008 (ICIP08), San Diego, California, USA, Oct. 2008, 4 pages.

(Continued)

*Primary Examiner* — Mehrdad Dastouri
*Assistant Examiner* — Nguyen Truong
(74) *Attorney, Agent, or Firm* — Conley Rose, P.C.; Grant Rodolph; William H. Dietrich

(57) ABSTRACT

An apparatus comprising a codec configured to predict an intra mode for a considered block based on a plurality of group numbers and a plurality of corresponding group indices for a plurality used modes of a plurality of adjacent blocks to the considered block, wherein a group number corresponding to an actual intra mode for the considered block is coded and sent if the predicted intra mode does not match the actual intra mode. Also disclosed is a network component comprising a processor configured to predict an intra mode for a considered block based on a minimum group number and a minimum group index of two used modes for two adjacent blocks of the considered block, and a transmitter configured to send coded bits of a group number for an actual intra mode for the considered block if the actual intra mode does not match the predicted intra mode.

23 Claims, 6 Drawing Sheets

(56) References Cited

OTHER PUBLICATIONS

"Advanced Video Coding for Generic Audiovisual Services," Series H: Audiovisual and Multimedia Systems—Infrastructure of Audiovisual Services—Coding of Moving Video, ITU-T Recommendation H.264, Mar. 2010, 676 pages.

Guichun Li, et al., "Integration of Plane Mode in Unified Intra Prediction," Joint Collaborative Team on Video Coding (JCT-VC) of ITU-T SG16 WP3 and ISO/IEC JTC1/SC29/WG11, 3rd Meeting, Guangzhou, China, Oct. 7-15, 2010, 5 pages.

Lingzhi Liu, "Multiple Predictor Sets for Intra Coding," Joint Collaborative Team on Video Coding (JCT-VC) of ITU-T SG16 WP3 and ISO/IEC JTC1/SC29/WG11, 1st Meeting, Dresden, Germany, Apr. 15-23, 2010, 10 pages.

Jeongyeon Lim, et al., "Description of Video Coding Technology Proposal by SK Telecom, Sejong University, and Sungkyunkwan University," Joint Collaborative Team on Video Coding (JCT-VC) of ITUT-T SG16 WP3 and ISO/IEC JTC1/SC29/WG11, 1st Meeting, Dresden, Germany, Apr. 15-23, 2010, 41 pages.

Marta Karczewicz, et al., "Video Coding Technology Proposal by Qualcomm Inc.," Joint Collaborative Team on Video Coding (JCT-VC) of ITU-T SG16 WP3 and ISO/IEC JTC1/SC29/WG11, 1st Meeting, Dresden, Germany, Apr. 15-23, 2010, 25 pages.

Jung-Hye Min, et al., "Unification of the Directional Intra Prediction Methods in TMuC," Joint Collaborative Team on Video Coding (JCT-VC) of ITU-T SG16 WP3 and ISO/IEC JTC1/SC29/WG11, 2nd Meeting, Geneva, Switzerland, Jul. 21-28, 2010, 3 pages.

Yan Ye, et al., "Improved Intra Coding," ITU Telecommunications Standardization Sector, Study Group 16, Question 6, Video Coding Experts Group (VCEG), 33rd Meeting, Shenzhen, China, Oct. 20, 2007, 6 pages.

\* cited by examiner

300

US 9,204,155 B2

MULTIPLE PREDICTOR SET FOR INTRA CODING WITH INTRA MODE PREDICTION

CROSS-REFERENCE TO RELATED APPLICATIONS

This application claims the benefit of U.S. Provisional Application No. 61/388,485 filed on Sep. 30, 2010 by Lingzhi Liu et al., entitled "Improved Multiple Predictor Set Intra Coding with Intra Mode Prediction," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, for example when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. Improved compression/decompression techniques that increase compression ratios without substantially reducing image quality are desirable due to limited network resources.

SUMMARY

In one embodiment, the disclosure includes an apparatus comprising a codec configured to predict an intra mode for a considered block based on a plurality of group numbers and a plurality of corresponding group indices for a plurality of used modes of a plurality of adjacent blocks to the considered block, wherein a group number corresponding to an actual intra mode for the considered block is coded and sent if the predicted intra mode does not match the actual intra mode.

In another embodiment, the disclosure includes a network component comprising a processor configured to predict an intra mode for a considered block based on a minimum group number and a minimum group index of two used modes for two adjacent blocks of the considered block, and a transmitter configured to send coded bits of a group number for an actual intra mode for the considered block if the actual intra mode does not match the predicted intra mode.

In another embodiment, the disclosure includes a network component comprising a receiver configured to receive coded bits of a group number for an actual intra mode for a considered block if the actual intra mode does not match the predicted intra mode, and a processor configured to decode the group number and use the decoded group number to identify the actual intra mode based on a predicted intra mode and a mapping between a plurality of group numbers and a plurality of corresponding groups for a plurality of intra modes.

In yet another embodiment, the disclosure includes a method implemented by at least one codec component comprising obtaining a minimum group number for two intra modes used for two adjacent blocks to a considered block, obtaining a minimum group index number for the two intra modes for the two adjacent blocks to a considered block, mapping the minimum group number and the minimum group index number to a predicted intra mode for the considered block, determining whether the predicted intra mode matches an actual intra mode used for the considered block, and sending a coded group number for the actual intra mode if the predicted intra mode does not match the actual intra mode.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
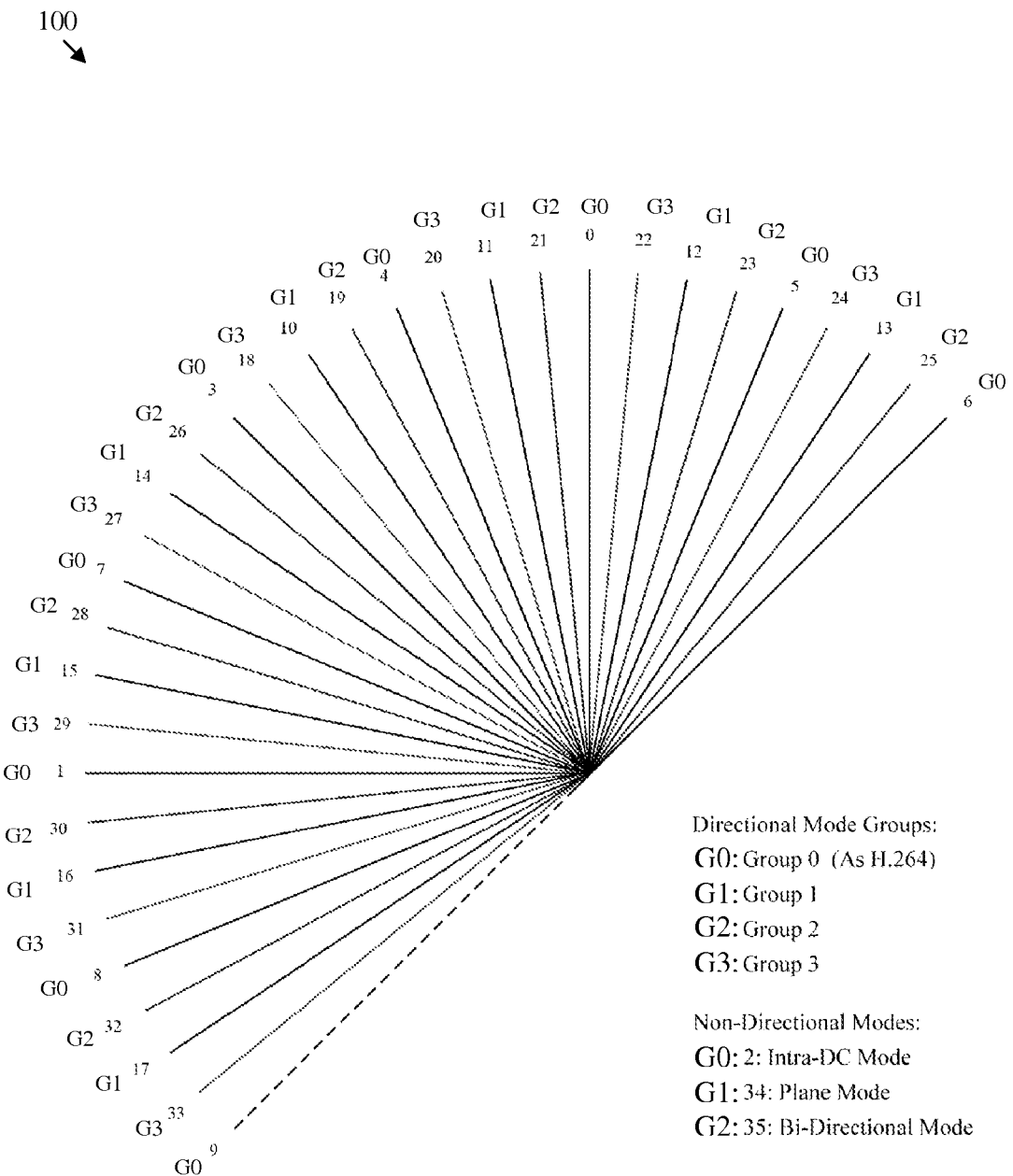
FIG. 1 is a schematic diagram of an embodiment of intra modes in multiple predictor sets.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. Typically, groups of pixels (macroblocks) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction. Intra-frame prediction may reduce spatial redundancies between adjacent and/or neighboring macroblocks (also referred to herein as blocks) in the same frame, thereby compressing the video data without greatly reducing image quality. Different forms of intra-frame prediction have been described by various conventional video/image coding standards, such as International Telecommunications Union (ITU) Telecommunications Standardization Sector (ITU-T) H.264 (hereinafter, H.264) and International Organization for Standardization (ISO)/International Electrotechnical Commission (IEC) Moving Picture Experts Group (MPEG) 4 Visual, both of which are incorporated herein by reference as if reproduced in their entirety.

In practice, intra-frame predication may be implemented by video encoders/decoders (codecs) to interpolate a predicted block from one or more previously coded/decoded neighboring blocks, thereby creating an approximation of the current block. Hence, the encoder and decoder may interpolate the predicted block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone does not reproduce an image of sufficient quality for modern video, and consequently an error correction message, e.g., a residual message, may be communicated between the encoder and decoder to correct differences between the predicted block and the current block. For instance, an encoder may subtract the predicted block from the current block to produce a residual block, which then may be transformed, quantized, and scanned before being coded into the coded data stream. Upon reception of the coded data stream, a decoder may add the reconstructed residual block to the independently generated predicted block to recreate the current block. Although the recreated current block may be an imperfect version of the original current block, e.g., due to the lossy nature of intra-frame coding compression, their differences may be so slight as to be virtually imperceptible to the human eye. Thus, substantial bit savings may be derived without noticeably reducing the quality of the reconstructed image.

The residual block may comprise differences between the predicted block and the current block, and therefore many of the residual block's discrete values, e.g., pixel data, may comprise zero and/or near-zero coefficients, e.g., in areas where the predicted block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra-frame prediction, e.g., each of which may generate a unique texture. An encoder may select the prediction mode that generates the most accurate prediction for each current block, and consequently may make more accurate predictions (on average) than other encoders that may use fewer prediction modes. For instance, recent research has shown that conventions using 36 intra-frame prediction modes may more accurately predict complex textures than conventions using fewer prediction modes, such as H.264, which uses only 9 intra-frame prediction modes. The intra-frame prediction modes are also referred to herein as intra modes, prediction modes, and predictors interchangeably. However, the encoder and decoder must use the same prediction mode when independently generating a predicted block, and thus the encoder, in some instances, may be required to communicate the selected prediction mode in the overhead of the data stream, e.g., when the selected prediction mode does not match the predicted prediction mode. As a result, increasing the number of prediction modes during intra-frame prediction may result in greater amounts of overheard, e.g., in terms of transmitted bits, thereby reducing (or in some cases eliminating) the bit savings achieved from the increased prediction accuracy.

For instance, a codec using a single prediction mode, e.g., a Direct Current (DC) prediction mode, may not require any overhead bits to communicate the prediction mode because the prediction mode remains fixed, and is therefore known by the decoder. Alternatively, a codec using 9 possible prediction modes (e.g., mode-zero, mode-one, . . . , mode-eight) may require four bits of overhead to directly communicate the selected prediction mode to the encoder. Then again, a codec using 36 possible prediction modes may require six bits of overhead to directly communicate the selected prediction mode to the encoder. Four (or six) bits of overhead per block may constitute a substantial amount of overhead over the course of an entire frame and/or sequence of frames, and may significantly decrease coding efficiency. Hence, in some cases the bit savings that result from increased prediction accuracy may be partially (or completely) offset by the additional overhead required to communicate the additional prediction mode combinations.

To reduce the bit cost associated with increased prediction mode combinations, modern video codecs may attempt to predict the prediction mode of the current block based on the prediction modes of one or more neighboring blocks. For instance, if a neighboring block directly above the predicted block has a vertical prediction mode, the codec may predict that the prediction mode corresponding to the current block may also be vertical. Further, if the selected prediction mode matches the predicted prediction mode, then the codec (e.g., the encoder) may clear a flag. Otherwise, the codec may set the flag. Importantly, the selected prediction mode is only coded if the prediction is incorrect. Thus, only one bit of overhead, e.g., one flag bit, may be transmitted when the prediction is correct, thereby resulting in an overhead bit savings of two bits, e.g., versus direct communication of the prediction mode. Alternatively, four bits of overhead, e.g., one flag bit and three bits indicating the correct prediction mode, may be transmitted when the prediction is incorrect, thereby resulting in an overhead bit cost of one bit, e.g., versus direct communication of the prediction mode. Consequently, predicting the prediction mode may result in an overhead savings if the prediction is correct and an overhead cost if the prediction is incorrect.

Codecs utilizing 9 possible prediction modes are frequently, e.g., more often than not, able to correctly predict the selected prediction mode, and thus the single layer prediction method described above tends to be relatively effective in reducing overhead cost. On the other hand, the overall probability that a codec will correctly predict the selected prediction mode decreases as additional prediction modes are used, and thus coding efficiencies may suffer and/or diminish accordingly. For instance, codecs using 36 prediction mode combinations (e.g., mode-one, mode-two, . . . mode-thirty-six) are, ceteris paribus, less likely to correctly predict the selected prediction mode, e.g., because the ratio of correct answers to incorrect answers decreases proportionally to the number of possible prediction modes.

For luminance block, H.264 introduces a total of 9 intra modes for 4×4 and 8×8 blocks. The 9 predictors include 8 directional modes and 1 non-directional mode, which is intra DC mode. Latest video coding technologies use more intra modes to improve prediction accuracy. In the Testing Model under Consideration (TMuC) from Joint Collaborative Team on Video Coding (JCT-VC), which is working on the next generation of international standard of video coding, the current best intra-frame prediction has up to 34 modes (33 directional modes and 1 DC mode). As described above, this produces higher accuracy of prediction on blocks with complex texture, but more bits are required in the bit stream to represent prediction modes.

Disclosed herein is a system and methods for improving the intra-frame prediction accuracy, which may reduce bit rate and improve coding efficiency in video compression systems. Accordingly, the prediction modes (also referred to herein as predictors) may be grouped into multiple groups. During encoding and decoding processes, the intra mode used by the current block may be predicted from to the adjacent blocks more accurately, hence saving the bits to represent the intra mode. Each prediction mode may be represented by a group number and a group index or index number in the group, which may be transmitted if needed instead of the intra mode number. Based on the group number and group index (or index number), the current block's prediction mode may be predicted upon the coded spatially adjacent blocks. This scheme may save bits for coding the prediction modes. The scheme may be used for the 34 modes in TMuC, which may be grouped into four groups, as described below.

FIG. 1 illustrates an embodiment of intra modes 100 in multiple predictor sets. The intra modes 100 may comprise about 36 prediction modes, which may include the TMuC prediction modes. The intra modes 100 may comprise directional modes and non-directional modes that may be used in intra-frame prediction. The intra modes 100 may be grouped into about 4 groups (G0, G1, G2, and G3), where each group may comprise about 9 prediction modes. Each group may be represented by a group number (e.g., from 0 to 3) and each prediction mode in a group may be represented by a group index or index number (e.g., from 0 to 8). A first group (G0) may comprise the same predictors as H.264/Advanced Video Coding (AVC). The remaining groups (G1, G2, and G3) may be obtained by rotating the first group (G0) for a determined angle, e.g., π/32 in FIG. 1. The non-prediction modes may comprise the DC or Intra-DC Mode in G0 (with index number 2), a Plane Mode in G1 (with index number 34), and a Bi-Directional Mode in G2 (with index number 35). Using more non-directional modes may produce more accurate intra-frame predictions.

Each of the prediction modes above may be identified by the designated group number and group index (or index number). Table 1 shows one embodiment of the group numbers and group indices (or index numbers) assigned to each prediction mode. The rows correspond to the 4 groups, where each row represents a group number (e.g., from 0 to 3). The columns correspond to the 9 prediction modes in each group, where each column represents a group index or index number (e.g., from 0 to 8). The entries in Table 1 correspond to the different prediction modes and represent the intra mode numbers. The group number (row number) and the group index or index number (column number) may be used to represent the corresponding intra mode number. For example, mode number 0 may be represented by group number 0 and index number 0, and mode number 31 may be represented by group number 3 and index number 8.

TABLE 1

Group Numbers and Group Indices for multiple Intra Modes.

| Group Number | Group Index (Index Number) | | | | | | | | |
|---|---|---|---|---|---|---|---|---|---|
| | 0 | 1 | 2 | 3 | 4 | 5 | 6 | 7 | 8 |
| 0 | 0 | 1 | 2 | 3 | 4 | 5 | 6 | 7 | 8 |
| 1 | 11 | 16 | 34 | 14 | 10 | 12 | 13 | 15 | 17 |
| 2 | 21 | 30 | 35 | 26 | 19 | 23 | 25 | 28 | 32 |
| 3 | 22 | 29 | 9 | 18 | 20 | 24 | 33 | 27 | 31 |

Figure 2:
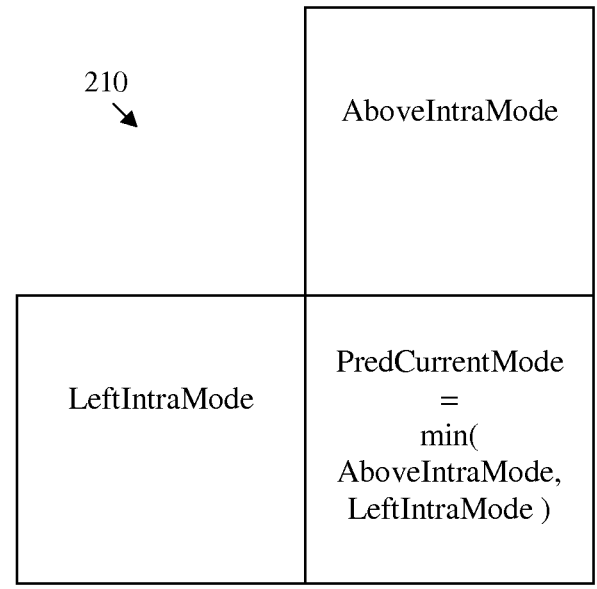
FIG. 2 is a schematic diagram of an embodiment of intra mode prediction schemes.
Figure 2:
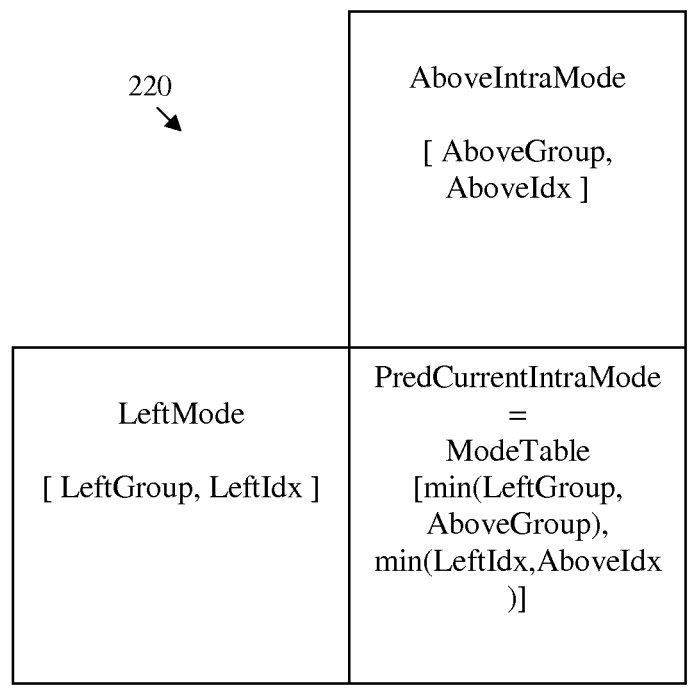

As described above, improving the efficiency of predicting the intra modes becomes more important or advantageous as the number of used intra modes (or predictors) increases. FIG. 2 shows one intra-frame prediction method that is used in TMuC (e.g., TMuC 0.7). Specifically, an intra mode for encoding/decoding a current block is predicted as the minimum value between a first intra mode number that was used for encoding/decoding a first block above the considered block and a second intra mode number that was used for encoding/decoding a second block to the left of the considered block. In the case where any of the first block (above the considered block) and the second block (to the left of the considered block) is not available, the intra mode for the considered block may be set to the DC mode. Such intra mode prediction method may be represented as:

PredCurrentMode=
Min(AboveIntraMode,LeftIntraMode), where PredCurrentMode is the predicted intra mode for the considered block, AboveIntraMode is the first intra mode used for the first (top) block, and LeftIntraMode is the second intra mode used for the second (left) block. The disadvantage of this method is that when the predicted intra mode is not the actual intra mode that was used to code the block (e.g., at the encoder), then the actual intra mode number used for encoding should be sent and included in the bit stream to the decoder. The encoder may determine whether to send the intra mode number to the decoder based on whether the predicted intra mode matches the actual used intra mode. When the number of modes is large, such as in TMuC, sending the intra mode numbers in the bit stream may increase the overhead (e.g., bandwidth usage).

FIG. 2 also illustrates an embodiment of an improved intra-frame prediction method that may be used, e.g., in TMuC, to reduce the overhead based on the group number and the group index (or index number) of the predicted mode. The group number and the group index corresponding to the actual intra mode number that is used for encoding may be sent instead of the actual intra mode number in the case where the predicted intra mode does not match the actual intra mode used for the considered block. In the case where any of the top block and the left block is not available, the intra mode for the considered block may be set to the DC mode, similar to the currently used method above. On average, the total bits in the group number may be fewer than the total bits in the intra mode number. This saving in the transmitted bit stream may further increase as more intra modes are used for intra-frame prediction.

Specifically, the group number of the intra mode for the considered block is predicted as the minimum value between a first group number for the intra mode used for the top block above the considered block and a second group number for the intra mode used for the left block to the considered block. Similarly, the group index or index number of the intra mode for the considered block is predicted as the minimum value between a first index number for the intra mode of the top block and a second index number for the intra mode of the left block. The indicated group number and group index (or index number) may then be used to obtain the intra mode number, for instance using Table 1 or similar mapping data structures. This intra mode prediction method may be represented as:

PredCurrentMode=
  ModeTable[Min(AboveGroup,LeftGroup),
  Min(AboveIdx,LeftIdx)], where AboveGroup is the group number of the intra mode used for the top block, LeftGroup is the group number of the intra mode used for the left block, AboveIdx is the index number of the intra mode used for the top block, and LeftInx is the index number of the intra mode used for the left block.

In the disclosed method above, the current group number CurrentGroup corresponding to the actual intra mode used for the considered block (e.g., at the encoder) may be predicted as PredCurrentGroup=Min(AboveGroup,LeftGroup).

The prediction result may correspond to one of two cases:
1) If CurrentGroup is equal to PredCurrentGroup, then one bit set "1" may be coded and sent in the bit stream (from encoder to decoder). This may indicate a match between CurrentGroup and PredCurrentGroup, where there is no need to indicate the predicted intra mode for the decoder since the decoder may successfully predicted the actual intra mode for the block.
2) If CurrentGroup is not equal to PredCurrentGroup, then one bit set to "0" may be first coded. This may indicate no match between CurrentGroup and PredCurrentGroup, and hence the group number (instead of the intra mode number) should be coded and indicated to the decoder in the bit stream. In some embodiments, the index number may also be coded and indicated in the bit stream. However, sending the index number with the group number may increase overload. To code the current group number CurrentGroup for the actual intra mode used for the block, the following formula may be implemented:

CurrentGroup=CurrentGroup>
  PredCurrentGroup?CurrentGroup−
  1:CurrentGroup.

The result may be coded into the bit stream.

As described in the scenario of FIG. 1, there may be 4 groups for the 36 prediction modes (in TMuC). If CurrentGroup is not equal to PredCurrentGroup at the encoder side, a "0" value bit may be first coded to indicate a mismatch. The encoder may then code CurrentGroup according to:

CurrentGroup=CurrentGroup>
  PredCurrentGroup?CurrentGroup−
  1:CurrentGroup.

As such, if CurrentGroup=0, then a bit set to "1" may be coded in the bit stream, after the bit "0". If CurrentGroup=1 or 2, then two bits "00" or "01", respectively, may be coded. At the decoder side, the decoder may first decode the "0" bit, and then if the next decoded bit is "1", the decoder may obtain CurrentGroup=0. Otherwise, if the next decoded bit is "0", the decoder may also decode one more bit in the bit stream. If the one more decode bit after the "0" bit is "0", then the decoder may obtain CurrentGroup=1. Otherwise, if the one more decode bit after the "0" bit is "1", then the decoder may obtain CurrentGroup=2. The CurrentGroup value may then be decoded by the decoder according to the equation:

CurrentGroup=CurrentGroup>=
  PredCurrentGroup?CurrentGroup+
  1:CurrentGroup.

This encoding/decoding scheme may not increase the complexity of implementation in the encoder/decoder and may be implemented without substantial change of the current prediction method in TMuC.

In TMuC, e.g., TMuC 0.7, two rounds of Rate-Distortion (R-D) cost searches may be performed for each prediction unit (PU) or prediction block. For instance using Hadamard transform, the first round may calculate the Sum of Absolute Different (SAD) between the original (actual) block and the predicted block for a set of directional intra modes. The tested directional mode with lowest SAD value may be selected as the estimated best directional intra mode, and may be compared with the predictors in a basic prediction mode set (the predictor sets may vary according to PU sizes) using real R-D cost calculation in the second round. To make better utilization of the disclosed intra mode prediction method (using the group number and group index) described above, additional intra modes may be calculated in the second round of R-D search. For instance, for 4×4 PUs, the intra mode 34 (Plane Mode) may be added to the second round of R-D search. Since the intra modes in the same group may have different bit length for the syntax (e.g., for 4×4, 8×8, 16×16, and 32×32 PUs), the prediction modes within the same index number in G0 and G1 may be calculated along with the estimated best directional mode, if the best directional mode does not belong to either.

Table 2 shows testing results using the two rounds of R-D cost searches and the disclosed intra frame prediction method (based on group number and group index). The testing results show that the average coding gain on a plurality of resolution classes (Classes B, C, D, and E) is about 0.6% on Intra High Efficiency Intra configuration testing, and about 0.7% on Intra Low Complexity configuration testing. The results show that with the disclosed method, the coding gain is improved on sequences with higher resolution, because more large prediction units may be selected, and more directions may be available for intra predictions. For instance, on 1080P resolution sequences (Class B), the disclosed method may produce average coding gains of about 0.6% and 0.7%. On 720P sequences (Class E), 0.8% and 0.9% of coding gains may be achieved.

TABLE 2

Coding Gain of Intra Mode using the disclosed method.

| | Intra High Efficiency | | | Intra Low Complexity | | |
|---|---|---|---|---|---|---|
| | Y BD-rate | U BD-rate | V BD-rate | Y BD-rate | U BD-rate | V BD-rate |
| Class B | −0.7% | −0.6% | −0.7% | −0.6% | −0.4% | −0.4% |
| Class C | −0.4% | −0.5% | −0.5% | −0.6% | −0.4% | −0.4% |
| Class D | −0.3% | −0.4% | −0.4% | −0.5% | −0.3% | −0.3% |
| Class E | −0.8% | −0.7% | −0.7% | −0.9% | −0.6% | −0.6% |
| All | −0.6% | −0.5% | −0.6% | −0.7% | −0.4% | −0.4% |

Figure 3:
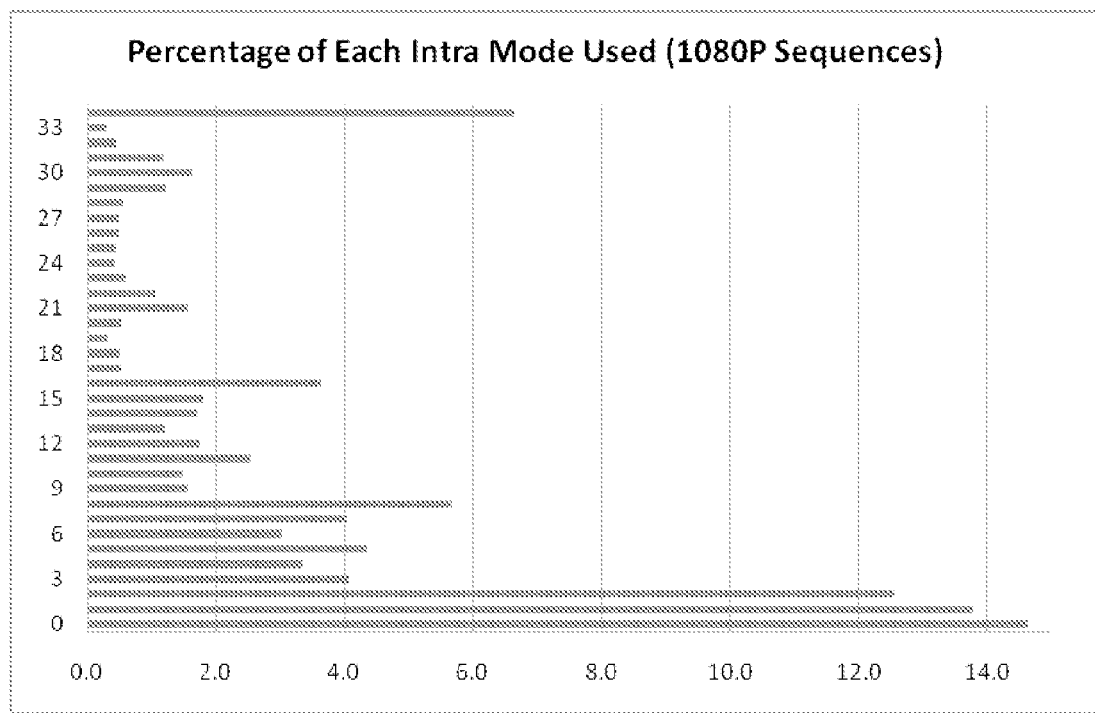
FIG. 3 is a chart of an embodiment of percentage use of intra modes.

FIG. 3 illustrates an embodiment of percentage use of intra modes based on the disclosed method. During the testing of the method, the data of coded intra prediction mode numbers was collected. FIG. 3 shows a chart indicating the average percentage of use for each intra predictor (intra mode) of all coded intra predictors on 1080P sequences. Table 3 also shows the average percentage of use for all the coded intra predictors. The integrated Plane Mode (mode 34) was used about 6.7% in all Intra Modes for luminance (Y BD-rate). The Plane Mode is labeled Plane in FIG. 3. This percentage of use was higher than other modes, except for modes 0, 1, and 2.

This may indicate that it may be necessary to use the Plane Mode in intra prediction, e.g., for most cases and/or PUs.

TABLE 3

Percentage of use for each Intra Mode Numer (1080P Sequences).

| Mode Number | 0 | 1 | 2 | 3 | 4 | 5 | 6 | 7 | 8 | 9 | 10 | 11 |
|---|---|---|---|---|---|---|---|---|---|---|---|---|
| Percentage | 14.6% | 13.8% | 12.6% | 4.1% | 3.4% | 4.3% | 3.0% | 4.0% | 5.7% | 1.6% | 1.5% | 2.5% |
| Mode Number | 12 | 13 | 14 | 15 | 16 | 17 | 18 | 19 | 20 | 21 | 22 | 23 |
| Percentage | 1.7% | 1.2% | 1.7% | 1.8% | 3.6% | 0.5% | 0.5% | 0.3% | 0.5% | 1.5% | 1.1% | 0.6% |
| Mode Number | 24 | 25 | 26 | 27 | 28 | 29 | 30 | 31 | 32 | 33 | 34 | |
| Percentage | 0.4% | 0.4% | 0.5% | 0.5% | 0.6% | 1.2% | 1.6% | 1.2% | 0.4% | 0.3% | 6.7% | |

Figure 4:
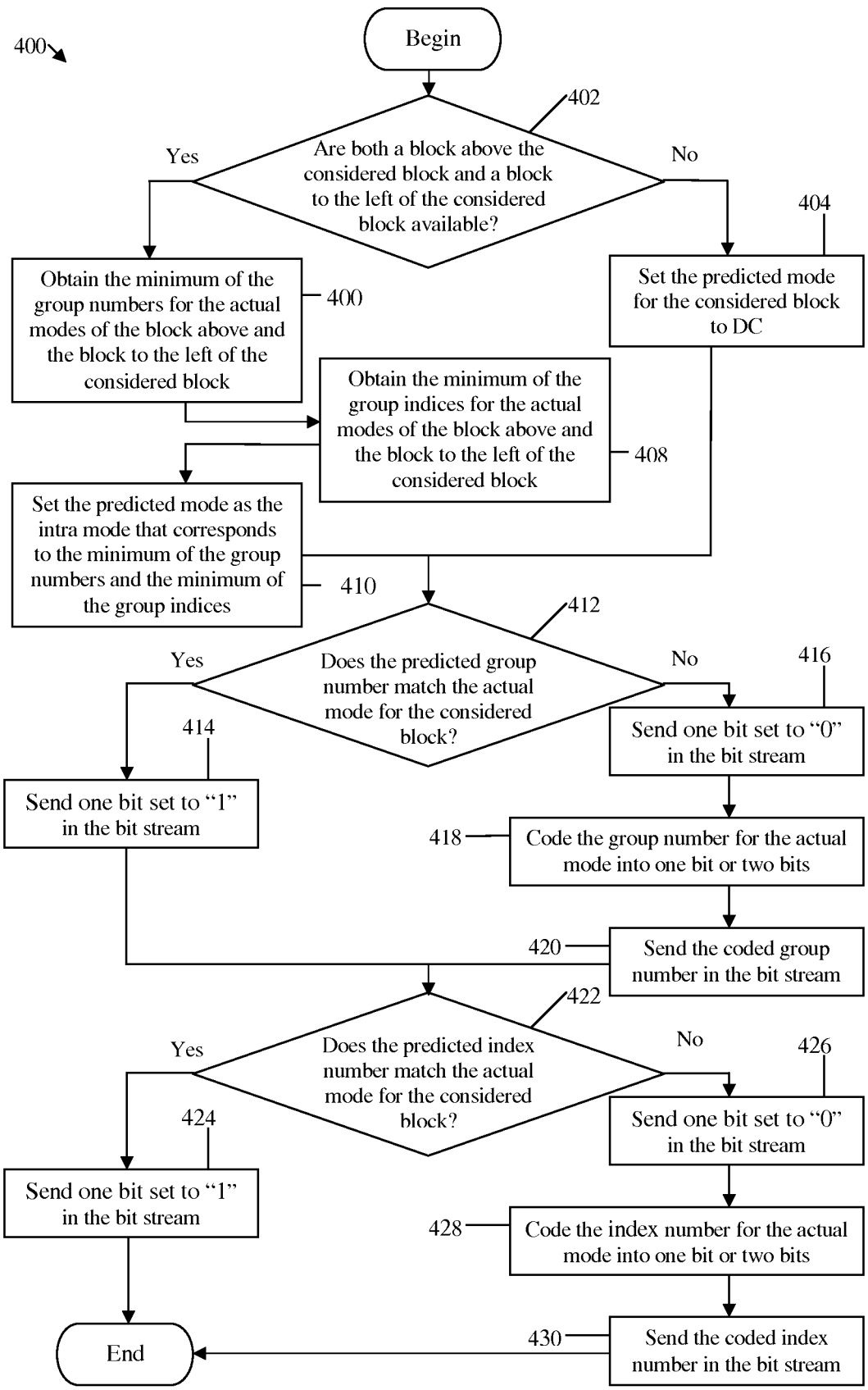
FIG. 4 is a flowchart of an embodiment of an intra mode prediction method.

FIG. 4 illustrates a flow chart of one embodiment of an intra mode prediction method 400 that is based on the group number and group index. The intra mode prediction method 400 may be used to improve the coding gain for sent intra modes (from encoder to decoder) and hence reduce overload in the bit stream. For instance, the method 400 may be implemented at the encoder. The method 400 may begin at block 402, where the method 400 may determine whether both a block above the considered block and a block to the left of the considered block are available. If the condition in block 402 is true, then the method 400 may proceed to block 406. Otherwise, the method 400 may proceed to block 404. At block 404, the predicted mode for the considered block may be set to DC, e.g., in the case where the block above and/or the block to the left of the considered block are not available. Alternatively at block 406, the minimum of the group numbers for the actual modes of the block above and the block to the left of the considered block may be obtained. At block 408, the minimum of the group indices for the actual modes of the block above and the block to the left of the considered block may be obtained. At block 410, the predicted mode may be set as the intra mode that corresponds to the minimum of the group numbers and the minimum of the group indices. For instance, a mapping table similar to Table 1 or any data structure may be used to implement the mapping.

Next at block 412, the method 400 may determine whether the predicted group number matches the actual group number for the considered block. If the condition in block 412 is true, then the method 400 may proceed to block 414. Otherwise, the method 400 may proceed to block 416. At block 414, one bit set to "1" may be sent in the bit stream. This may indicate to the decoder that the predicted group number matches the actual group number for the considered block. In this case, there may be no need to specify the predicted group number to the decoder since the decoder may be able to predict the intra mode for the considered block successfully. The method 400 may then proceed to 422. Alternatively at block 416, one bit set to "0" may be sent in the bit stream. This may indicate to the decoder that the subsequent bit(s) in the bit stream specify the actual group number for the considered block. At block 418, the group number for the actual mode may be coded into one or two bits, as described above. At block 420, the coded group number may be sent into the bit stream. For example, using the formula above to code CurrentGroup, one bit may be set to "1" if CurrentGroup is G0, or two bits may be set to "00" if CurrentGroup is G1, to "01" if CurrentGroup is G2. The method 400 may then proceed to 422. In other embodiments, different bit values than described above may be used to code the group number.

Next at block 422, the method 400 may determine whether the predicted index number matches the actual index number for the considered block. If the condition in block 422 is true, then the method 400 may proceed to block 424. Otherwise, the method 400 may proceed to block 426. At block 424, one bit set to "1" may be sent in the bit stream. This may indicate to the decoder that the predicted index number matches the actual index number for the considered block. In this case, there may be no need to specify the predicted group number to the decoder since the decoder may be able to predict the intra mode for the considered block successfully. The method 400 may then end. Alternatively at block 426, one bit set to "0" may be sent in the bit stream. This may indicate to the decoder that the subsequent bit(s) in the bit stream specify the actual index number for the considered block. At block 428, the index number for the actual mode may be coded into three bits, as described above. At block 420, the coded group number may be sent into the bit stream. For example, using the formula above to code CurrentIndex, three bit may be set to "000" if CurrentGroup is 0. The method 400 may then end. In other embodiments, different bit values than described above may be used to code the index number.

Figure 5:
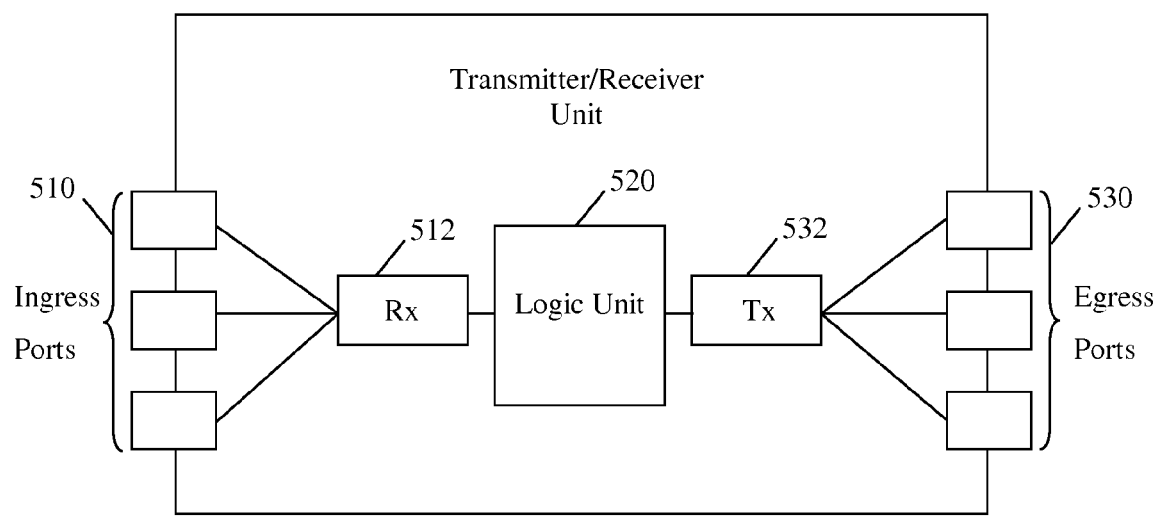
FIG. 5 is a schematic diagram of an embodiment of a transmitter/receiver unit.

FIG. 5 illustrates an embodiment of a transmitter/receiver unit 500, which may be located at, coupled to, or part of any of the codecs (encoder/decoder) described herein or any other component within a network or system. The transmitter/receiver unit 500 may be any device that processes images as described herein. For instance, the transmitter/receiver unit 500 may correspond to or may be located in a media controller at an image transmitter and/or receiver. The transmitted/receiver unit 500 may comprise a plurality of ingress ports 510 and/or receiver units 512 for receiving data from other codecs, logic unit or processor 520 to process images and determine which codecs to send the data to, and a plurality of egress ports 530 and/or transmitter units 532 for transmitting data to the other codecs. The logic unit or processor 520 may be configured to implement any of the schemes described herein, including the intra mode prediction method 400 and may be implemented using hardware, software, or both.

Figure 6:
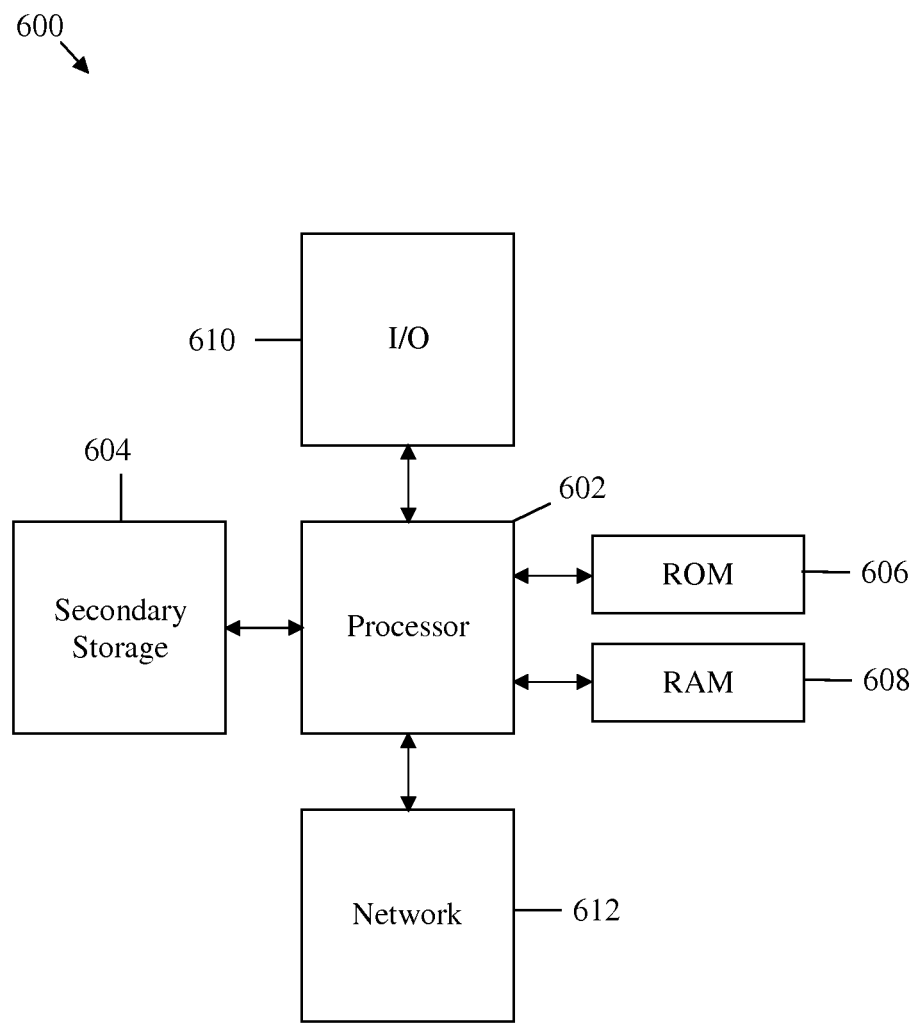
FIG. 6 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 6 illustrates a typical, general-purpose network component or computer system 600 suitable for implementing one or more embodiments of a node disclosed herein. The general-purpose network component or computer system 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor may be implemented as one or more CPU chips, or may be part of one or more application specific integrated circuits (ASICs) and/or digital signal processors (DSPs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a codec configured to predict an intra mode for a considered block based on a plurality of group numbers and a plurality of corresponding group indices for a plurality of used modes of a plurality of adjacent blocks to the considered block,
wherein a group number corresponding to an actual intra mode for the considered block is signaled if the predicted intra mode does not match the actual intra mode,
wherein the predicted intra mode is one of a plurality of intra modes separated in a plurality of groups,
wherein each of the intra modes is only included in one of the groups, and
wherein two rounds of Rate-Distortion (R-D) cost search are performed for each considered block, and wherein one or more additional intra modes in comparison to Testing Model under Consideration (TMuC) implementation are considered in a second round of the R-D cost search.

2. The apparatus of claim 1, wherein each of the groups is assigned a different group number and each of the intra modes in each of the groups is assigned a different group index.

3. The apparatus of claim 2, wherein there are four groups that each comprises 9 intra modes.

4. The apparatus of claim 2, wherein the intra modes in the four groups include 34 predefined intra modes.

5. The apparatus of claim 2, wherein the intra modes in the four groups include a plurality of directional and non-directional intra modes.

6. The apparatus of claim 5, wherein the non-directional intra modes include at least one of a Direct Current (DC) Mode, a Plane Mode, and a Bi-Directional Mode.

7. The apparatus of claim 1, wherein the predicted intra mode corresponds to the minimum value of the group numbers and the group indices.

8. The apparatus of claim 1, wherein the adjacent blocks comprise a block to the left of the considered block and a block above the considered block.

9. The apparatus of claim 1, wherein the group number is not coded if the predicted intra mode matches the actual intra mode.

10. A network component comprising:
a processor configured to predict an intra mode for a considered block based on a minimum group number and a minimum group index of two used modes for two adjacent blocks of the considered block; and a transmitter configured to send coded bits of a group number for an actual intra mode for the considered block if the actual intra mode does not match the predicted intra mode, wherein the intra mode is predicted using the following equation:

PredCurrentMode=
    ModeTable[Min(AboveGroup,LeftGroup),
    Min(AboveIdx,LeftIdx)], where AboveGroup is a group number of a first intra mode used for a top block above the considered block, LeftGroup is an index number of a second intra mode used for a left block to the considered block, AboveIdx is an index number of the first intra mode, and LeftInx is an index number of the second intra mode.

11. A network component comprising:
a processor configured to predict an intra mode for a considered block based on a minimum group number and a minimum group index of two used modes for two adjacent blocks of the considered block; and
a transmitter configured to send coded bits of a group number for an actual intra mode for the considered block if the actual intra mode does not match the predicted intra, wherein the group number of the actual intra mode is coded using the following equation:

CurrentGroup=CurrentGroup>
    PredCurrentGroup?CurrentGroup−
    1:CurrentGroup, where CurrentGroup is the group number of the actual intra mode and PredCurrentGroup is the predicted intra mode.

12. A network component comprising:
a processor configured to predict an intra mode for a considered block based on a minimum group number and a minimum group index of two used modes for two adjacent blocks of the considered block; and
a transmitter configured to send coded bits of a group number for an actual intra mode for the considered block if the actual intra mode does not match the predicted intra, wherein two rounds of Rate-Distortion (R-D) cost search are performed for each considered block, and wherein one or more additional intra modes in comparison to Testing Model under Consideration (TMuC) implementation are considered in a second round of the R-D cost search.

13. The network component of claim 12, wherein a Plane Mode is one additional intra mode considered in the second round of R-D search for a 4×4 considered block.

14. A network component comprising:
a receiver configured to receive coded bits of a group number for an actual intra mode for a considered block if the actual intra mode does not match the predicted intra mode, and
a processor configured to decode the group number and use the decoded group number to identify the actual intra mode based on a predicted intra mode and a mapping between a plurality of group numbers and a plurality of corresponding groups for a plurality of intra modes,
wherein the group number of the actual intra mode is decoded using the following equation:

CurrentGroup=CurrentGroup>=
    PredCurrentGroup?CurrentGroup+
    1:CurrentGroup, where CurrentGroup is the group number of the actual intra mode and PredCurrentGroup is the predicted intra mode.

15. The network component of claim 14, wherein the predicted intra mode is based on a minimum group number and a minimum group index of two used modes for two adjacent blocks of the considered block.

16. A network component comprising:
a receiver configured to receive coded bits of a group number for an actual intra mode for a considered block if the actual intra mode does not match the predicted intra mode, and
a processor configured to decode the group number and use the decoded group number to identify the actual intra mode based on a predicted intra mode and a mapping between a plurality of group numbers and a plurality of corresponding groups for a plurality of intra modes, wherein two rounds of R-D cost search are performed for each considered block, and wherein one or more additional intra modes in comparison to Testing Model Consideration (TMuC) implementation are considered in a second round of the R-D cost search.

17. The network component of claim 16, wherein a Plane Mode is one additional intra mode considered in the second round of R-D cost search for a 4×4 considered block.

18. A method implemented by at least one codec component comprising:
obtaining a minimum group number for two intra modes used for two adjacent blocks to a considered block;
obtaining a minimum group index number for the two intra modes for the two adjacent blocks to a considered block;
mapping the minimum group number and the minimum group index number to a predicted intra mode for the considered block, wherein the predicted intra mode is included in only one group;
determining whether the predicted intra mode matches an actual intra mode used for the considered block;
determining a group number for the actual intra mode if the predicted intra mode does not match the actual intra mode; and
performing two rounds of Rate-Distortion (R-D) cost search for each considered block and considering one or more additional intra modes in comparison to Testing Model under Consideration (TMuC) implementation in a second round of the R-D cost search.

19. The method of claim 18, wherein a group number and group index number for a Direct Current (DC) intra mode is used for any of the two adjacent blocks if the adjacent block is not available.

20. The method of claim 18, wherein only one bit that is set to indicate a match between the actual intra mode and the predicted intra mode is signaled if the actual intra mode and the predicted intra mode match.

21. The method of claim 18, wherein one bit that is set to indicate a mismatch between the actual intra mode and the predicted intra mode is signaled if the actual intra mode and the predicted intra mode do not match, and wherein the set bit is signaled before signaling the group number for the actual intra mode.

22. The method of claim 21, wherein the group number is signaled using one set bit or two set bits.

23. The method of claim 18, wherein the group number of the actual intra mode is signaled instead of signaling the actual intra mode number.

* * * * *

UNITED STATES PATENT AND TRADEMARK OFFICE
CERTIFICATE OF CORRECTION

PATENT NO. : 9,204,155 B2  Page 1 of 1
APPLICATION NO. : 13/247555
DATED : December 1, 2015
INVENTOR(S) : Lingzhi Liu et al.

It is certified that error appears in the above-identified patent and that said Letters Patent is hereby corrected as shown below:

On the Title Page:
Item (75) Inventors: Delete "Cheng-Xiong Zhang, Plano, TX (US)" and insert -- Chen-Xiong Zhang, Plano, TX (US) --

Signed and Sealed this
Nineteenth Day of April, 2016

Michelle K. Lee
*Director of the United States Patent and Trademark Office*